Nov. 10, 1959   G. M. GROENENDYKE   2,912,673
SYSTEM FOR VISUAL DISPLAY OF TRANSIENTS
Filed Sept. 28, 1955   5 Sheets-Sheet 1

Nov. 10, 1959 G. M. GROENENDYKE 2,912,673
SYSTEM FOR VISUAL DISPLAY OF TRANSIENTS
Filed Sept. 28, 1955 5 Sheets-Sheet 5

_United States Patent Office_

2,912,673
Patented Nov. 10, 1959

2,912,673

SYSTEM FOR VISUAL DISPLAY OF TRANSIENTS

Goethe M. Groenendyke, Dallas, Tex., assignor, by mesne assignments, to Socony Mobil Oil Company, Inc., New York, N.Y., a corporation of New York Application September 28, 1955, Serial No. 537,157

8 Claims. (Cl. 340—15)

This invention relates to methods of and apparatus for facilitating the study and analysis of transient waves to be recorded in phonographically-reproducible form, and more particularly to methods and apparatus for the recording of transient electrical signals in phonographically-reproducible form and the production of a visual display of such signals by intensity-modulation of a high-frequency raster of a cathode ray tube.

While the present invention is applicable broadly to a study of transients, as in acoustical investigations, it is particularly applicable as a tool in the analysis of seismic surveys in which the traces on the seismogram provide valuable information as to the depth and character of subsurface formations. Seismograms in general are reproducible photographically as from a film or magnetically as from a magnetic tape. The present invention is particularly concerned with seismograms which are recorded in phonographically-reproducible form. By "phonographically-reproducible," I mean seismograms which may be utilized to produce electrical pulses representative of the instantaneous magnitudes of each trace on the seismogram by means of which the seismic records can be analyzed as to their component parts and again recorded in terms of the whole or separate parts thereof. Thus, under this definition it will be seen that wax recordings, magnetic records on steel or iron wire or on magnetic tape and the like are considered full equivalents one to the other and that they include variable area or variable density film.

The present invention is particularly applicable to systems of the type disclosed and claimed in copending application Serial No. 388,582, entitled, "Seismic Record Display and Re-recording System," filed by George B. Loper and Robert R. Pittman. In that application electronic switches were utilized in reproducing on the screen of the cathode ray tube traces of the seismogram.

The present invention is an improvement over that of the aforesaid joint application Serial No. 388,582 and over that of copending application Serial No. 519,800, filed July 5, 1955, entitled, "Intensity-Modulated Transient Display," filed by George B. Loper. In accordance with the first-mentioned application, a magnetic tape is formed into a continuous loop. It has recorded thereon the transient signal or signals. The continuous loop permits cyclic reproduction of the transient signal or signals and with the aforesaid apparatus permits a continuous visual display of the transient.

More particularly, the Loper and Pittman application discloses a system for studying a primary seismic record of transient waves having associated therewith a periodic time base signal and an initial marker in predetermined time relation to the instant of generation of the transient. The system includes a means for cyclically scanning the phonographically-reproducible record repeatedly to produce on a time scale or base a first signal corresponding to the transient wave, a second signal corresponding to the periodic time-base signal and a third signal coincident and corresponding with the initial time marker. A visual monitoring unit, having a signal channel and a control channel, is connected to the scanning means for application of the transient to the monitoring unit signal channel. A normally non-conductive unit or gate connected to the scanning means is responsive to the second signal. A circuit responsive to the third or initial marker signal is connected between the scanning means and the non-conductive circuit to render it conductive during each cycle of the transient or first signal at a time coincident with the initial time marker. A counter or pulse-selecting circuit is connected between the normally non-conductive unit and the control channel of the monitoring means to apply to the control channel a selected cycle of the second signal to actuate the monitoring means and render it responsive to the first signal. Another means operable in the interval following the selected cycle of the second signal and the beginning of the next succeeding cycle of the first signal renders non-conductive the unit responsive to the second signal. By this system, selected portions of the seismic trace are fed into the visual monitoring unit at a persistence-of-vision rate and the trace modified to provide a maximum of intelligence before it is permanently re-recorded.

In aforementioned application Serial No. 519,800 there is provided in a system of the type above described a cathode ray tube having a raster formed by the sweeping of a fluorescent screen by an electron beam maintained at a very low intensity, or even blocked. Intensity-modulation of the beam is provided by means responsive to the seismic or transient signals to intensify the beam for visual production of patterns in the raster corresponding in shape with the waveform of the transient or modifications thereof.

The present invention, in one aspect, relates to new circuitry of low power requirements, as compared with the circuitry of the above application, for producing a visual display of a phonographically-reproducible seismogram.

In accordance with the present invention, there is included in a system comprised of a cathode ray tube having associated therewith control circuits which sweep the electron beam of the tube to form a raster a voltage comparator which produces a control signal each time a signal representative of the transient or seismic wave bears a predetermined relation to an initiating signal. The control signal thus generated determines the time at which the intensity of the electron beam will be increased to produce visual dots in the raster to represent the waveform of the transient or modifications thereof.

More particularly, there is provided in accordance with the present invention a system for displaying a phonographically-reproducible record of transient waves comprising a cathode ray tube having associated therewith means including control circuits for applying beam-deflecting signals to the tube. The beam, preferably at low intensity, is swept across the face of the cathode ray tube by the signals to form a high-frequency raster. An initiating signal is generated and applied to a control circuit together with a signal of amplitude representative of the instantaneous amplitude of the transient wave. The control circuit compares the magnitudes of the aforementioned signals; and when they bear a predetermined relation, produces a control pulse which is applied to the cathode ray tube to increase the intensity of the beam to make it visible at a point representative of the instantaneous amplitude of the transient wave.

In a preferred arrangement the control circuit is comprised of a comparator which produces a control signal whenever the signal representative of the instantaneous amplitude of the transient wave bears a predetermined relation to the instantaneous amplitude of the initiating signal. The control signal is then applied to a blocking oscillator, which in turn produces a control pulse which is applied to an intensity-control element of the cathode ray tube for increasing the intensity of the electron beam for production of a dot in the raster at the face of the tube.

In accordance with further aspects of the present invention, different utilization systems can be used in substitution for the display means formed by the cathode ray oscilloscope. In this connection, the combination of circuitry used in the display system functions to produce time-modulation of seismic signals greatly to extend the effective dynamic range of recording. When it is considered that the dynamic range encountered in the reception of seismic signals may be as great as 80 db and that the best obtainable magnetic recording system is limited to a dynamic range of 48 db, it will be understood that the present time-modulation recording system, which may have a dynamic range as great as 60 db, is of great importance in the production of seismic records of much greater value to persons who interpret them in the determination of the character of sub-surface formations.

In one form of carrying out the present invention, there is provided in a system for converting seismic signals of varying amplitudes to time-modulated signals an oscillator for periodically generating initiating pulses or signals. In addition, there is provided a source of electrical signals representative of the instantaneous amplitudes of the seismic wave. The initiating pulses and the electrical signals are applied to a time-modulating circuit which is responsive to a predetermined relationship between instantaneous amplitudes of the initiating pulses and the electrical signals for producing a plurality of time-modulated pulses. The time-modulated pulses, containing information as to the character of the seismic wave, are applied to a magnetic recorder for the production of a reproducible record.

In a preferred form of this aspect of the present invention, the time-modulating circuit is in the form of a voltage comparator whose pulse output is in the nature of variably spaced pulses applied to a utilization circuit. The information as to the character of the seismic wave is contained in the width of the pulses.

In yet another aspect of the present invention, there is provided a system which permits the visual presentation of a seismic wave to those conducting the seismic survey in the field. In this connection, the reproducible record is produced having signals of a time-modulated character, and the oscillator, which produces the initiating pulses or signals for the recording of the seismic signals, is also connected to provide sweep signals for the oscilloscope and to generate initiating pulses for the voltage comparator associated with the production of beam-intensity control pulses to be applied to the control element of the cathode ray tube for the intensity-modulation of the electron beam thereof to produce at the face of the tube a visual display of the seismic signal.

For further objects and advantages of the present invention, reference may be made to the following description taken in conjunction with the accompanying drawings in which:

Fig. 2A is a fragmentary portion of a cathode ray tube employing magnetic deflection;

Figure 3:
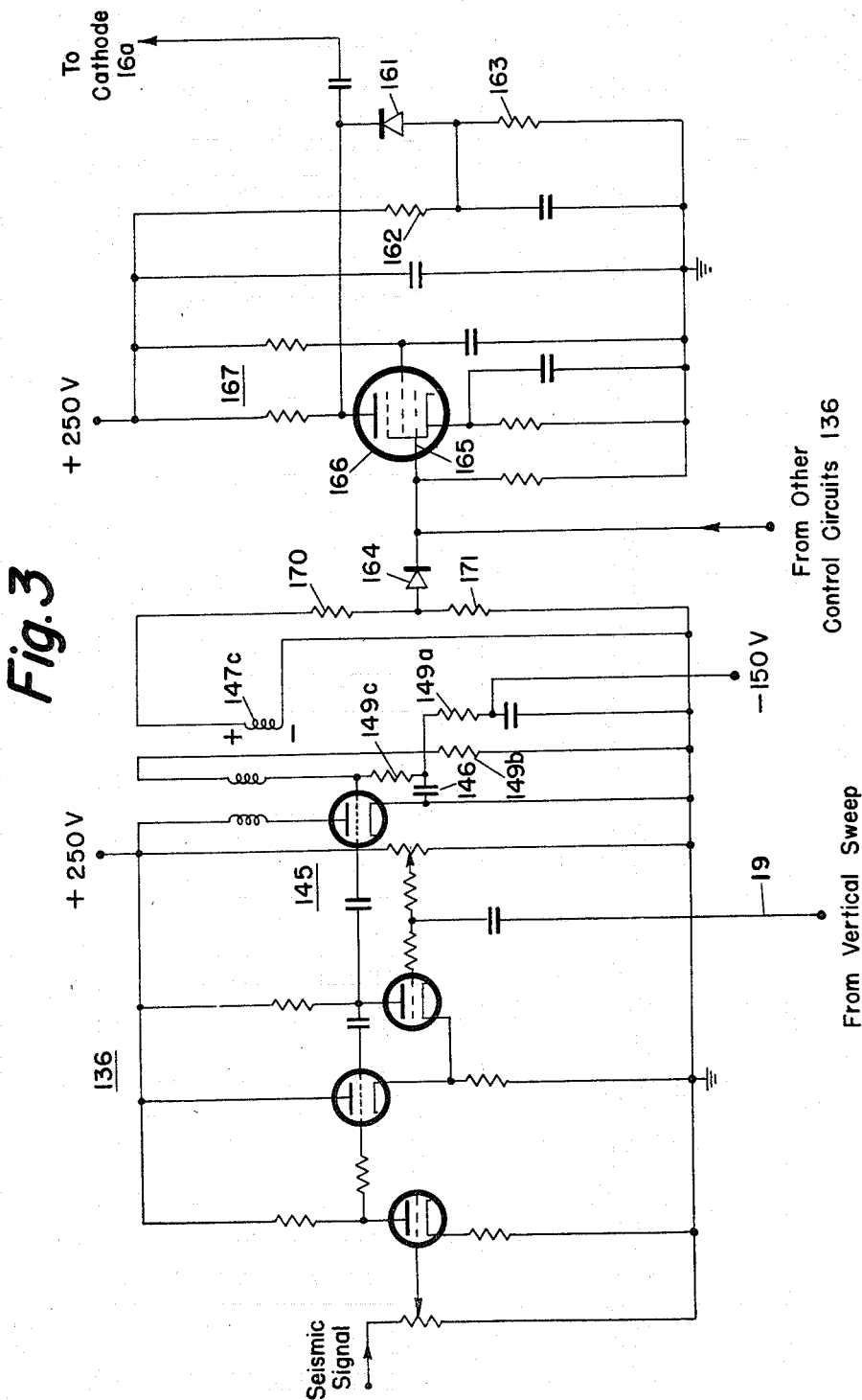
Figure 4:
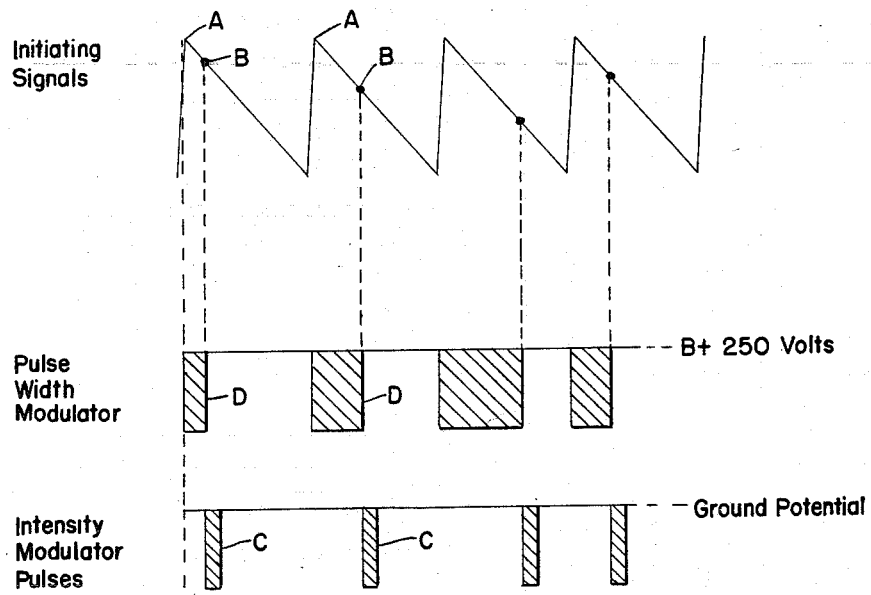
Figure 5:
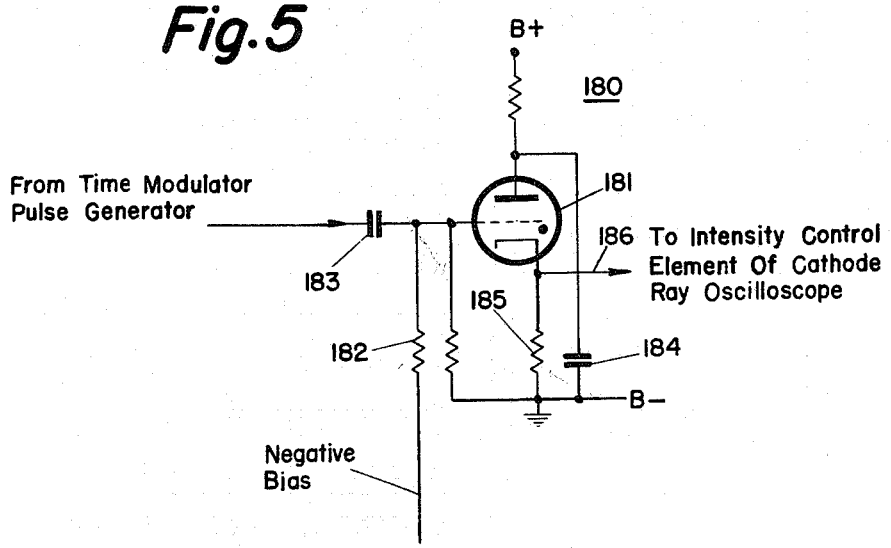
Figure 6:
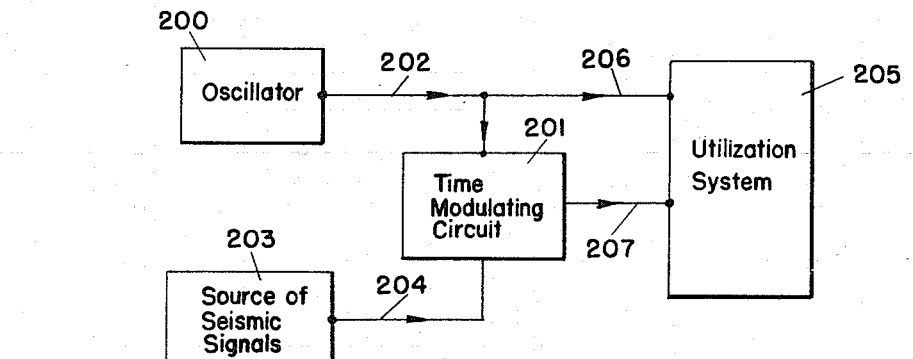
Figure 7:
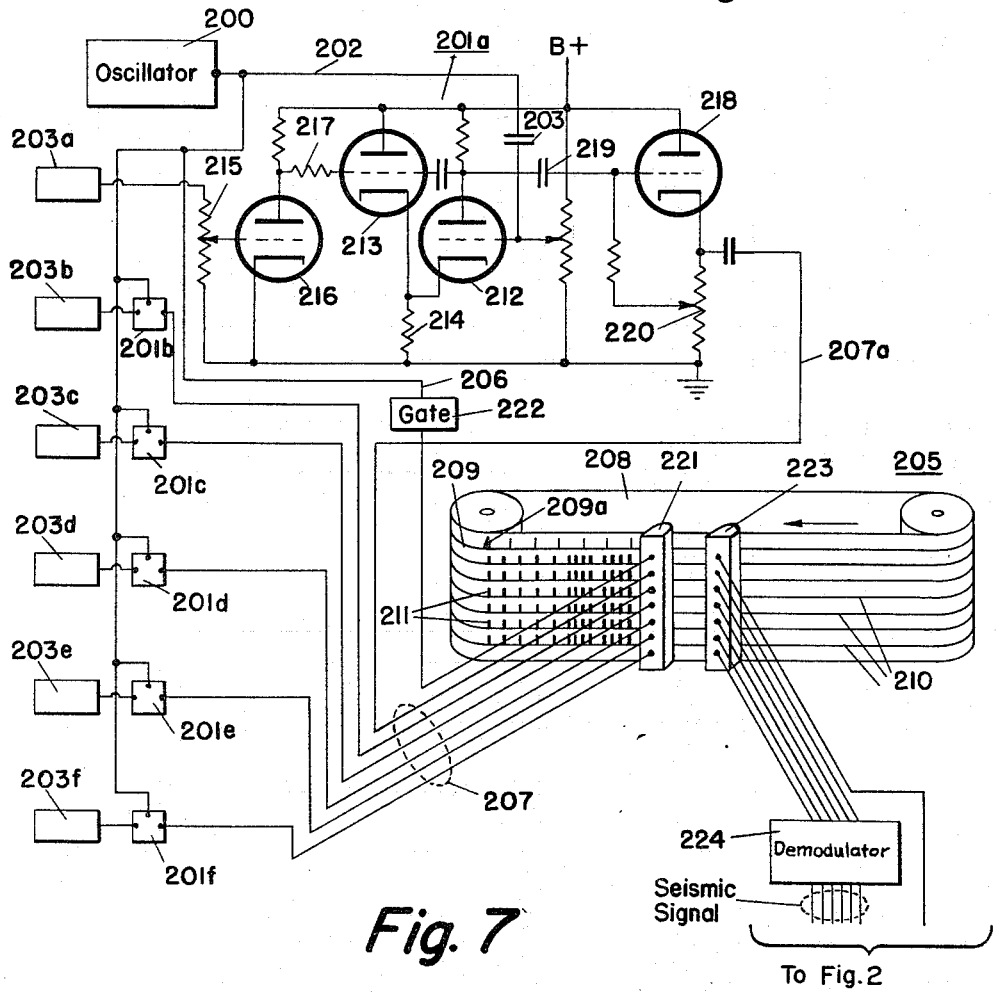

Fig. 3 schematically illustrates another modification which is applicable in the practice of the present invention;

Fig. 4 is a graphic display helpful in the understanding of the present invention;

Fig. 5 schematically illustrates a form of pulse generator useful in the practice of the present invention;

Fig. 6 illustrates in block-diagram form another aspect of the present invention; and Fig. 7 illustrates in block-diagram form and in partial schematic the application of the system of Fig. 6 to a recording and play-back system.

There will first be described the invention as applied to a utilization system comprising an oscilloscope. After that system has been presented, the features of the circuitry for producing the time-pulse modulation for extending the dynamic range of recording will be presented.

Figure 1:
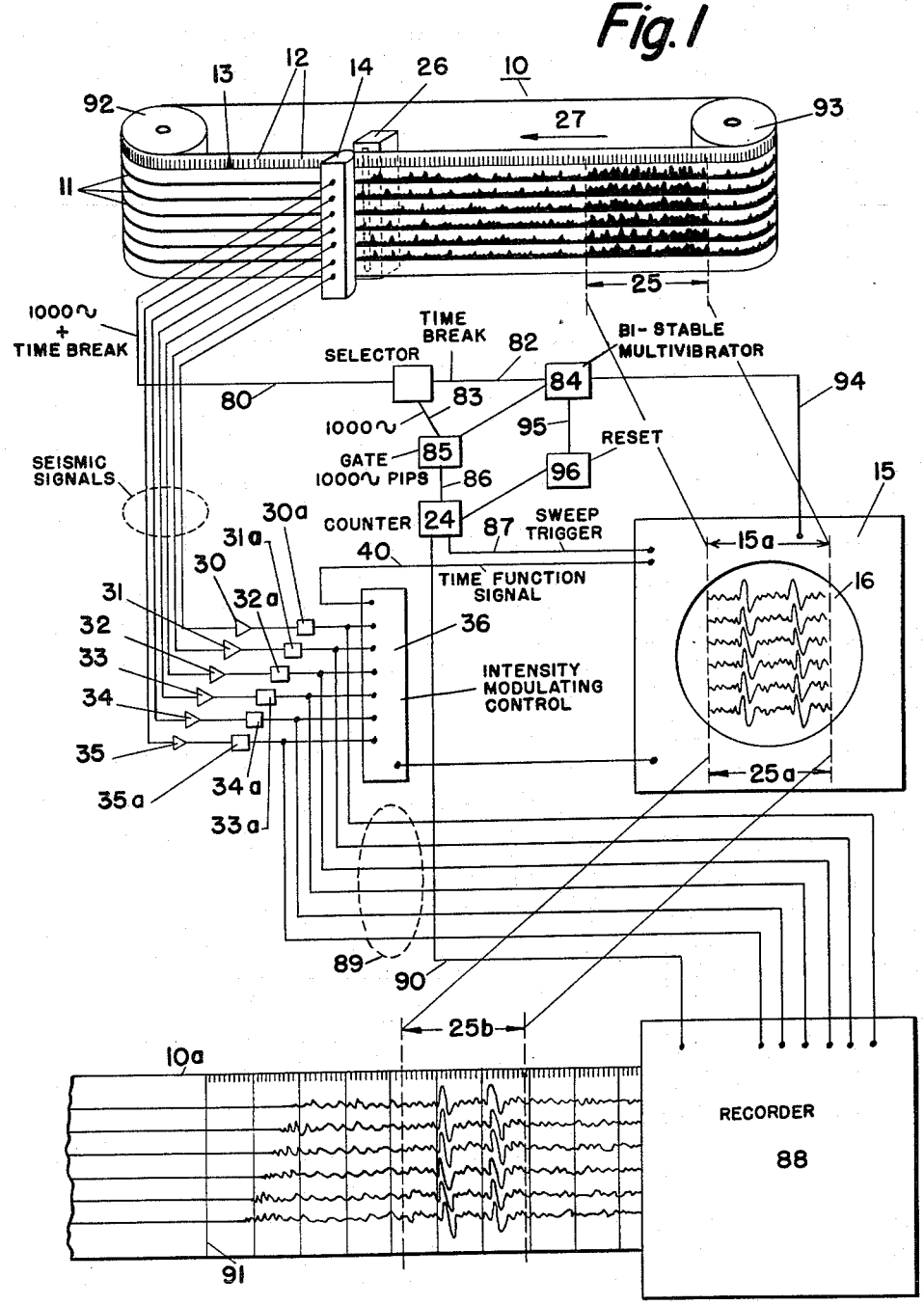
Fig. 1 illustrates a seismic display system, portions of which are in block-diagram form.

Referring now to Fig. 1, a "six-trace seismogram" is shown in the form of a variable area recording on a transparency such as a photographic record film 10. The six transient or signal traces 11 vary in amplitude in accordance with seismic signals received at a corresponding number of receiving stations spaced along a line on the surface of the earth in accordance with conventional seismic practices.

Though magnetic tape recording may be preferred, a variable area recording has been adapted for the purpose of the present description since the functions to be considered may be graphically portrayed more readily than other forms of recording. It will be apparent that other types of phonographically-reproducible records may be utilized in practicing the invention. For example, the variations in amplitude on the film 10 may be taken to represent intensity of magnetization of a magnetic tape or the modulation of a carrier for recording on a magnetic tape. Although the seismic signal has been represented in Fig. 1 as being recorded in the form of an amplitude-modulated wave, it will be apparent from the discussion that follows hereinafter, regarding that aspect of the present invention relating to the recording of seismic waves, that the nature of the recording representative of seismic waves may be in the form of a time-modulated recording, comprised of spaced pulses.

Since the general procedure for obtaining seismic records is well known and understood by those skilled in the art, it will not be described here in detail. Briefly, however, at a sending station spaced from the receiving stations, an explosive charge is detonated to produce seismic waves, an electrical impulse being generated coincident with the detonation of the explosive charge. The latter impulse is recorded as the time-break pulse or the initial marker 13 along with the timing signal 12 on the seventh record trace (the top trace, Fig. 1). The time-break pulse 13 and the periodic timing signal 12 are utilized accurately to measure the time required for energy to travel from the aforementioned sending station to a subsurface reflecting bed and back to the receiving stations. While a relatively high-frequency periodic timing signal, i.e., a carefully controlled 1,000 cycle per second signal, ordinarily is used, a low-frequency pulse signal has been here adopted and shown in Fig. 1 for the purpose of illustration only, it being representative of the conventionally employed high-frequency signal.

The seismic data recorded on the six traces 11 is characterized by initially high energy levels corresponding with the arrival of refracted waves successively at each receiving station and thereafter followed by a relatively quiescent period. In the record interval 25, it will be noted that there is a prominent burst of energy, this energy appearing at an intermediate record time in such a manner as to be generally indicative of energy reflected from a subsurface bed. That all of the receiving stations are affected by a given burst of energy at approximately the same instant after detonation of the explosive is apparent from a mere inspection of the record. However, the reduction of such information to accurate data useful in calculating the depth of the causal reflecting interface is often an impossible task. This is particularly true when the seismic energy represented by variations in trace amplitude is singular in character from trace to trace. Seismologists in their interpretation of seismic records rely upon coincidence not only of the time-occurrence of record energy but also upon substantial coincidence in the character of the seismic energy at the several seismic detecting stations. The system illustrated in Fig. 1, as will hereinafter appear, is particularly useful in reducing to useful data the seismic information from a record that otherwise may not be utilized in determining the location and/or nature of subsurface beds.

Varying voltages are produced which correspond both in number and in form to the signal traces 11 on the record 10. For example, they may be produced by a light-sensitive device housed in the unit 14 onto which a beam of light from a source 26 is projected. Unit 14 may include a plurality of transducers such as photoelectric cells. The light beam passes through a slit in the housing of source 26 and through the record 10 as it travels at substantially constant velocity past unit 14 in the direction of the arrow 27.

The signals from unit 14 are applied through seismic signal channels and a beam-intensity time-control unit 36 to the monitoring unit or cathode ray oscilloscope 15 where, in accordance with the present invention, the electron beam is intensity-modulated to produce a trace representative of the transient or seismic wave.

Figure 2:
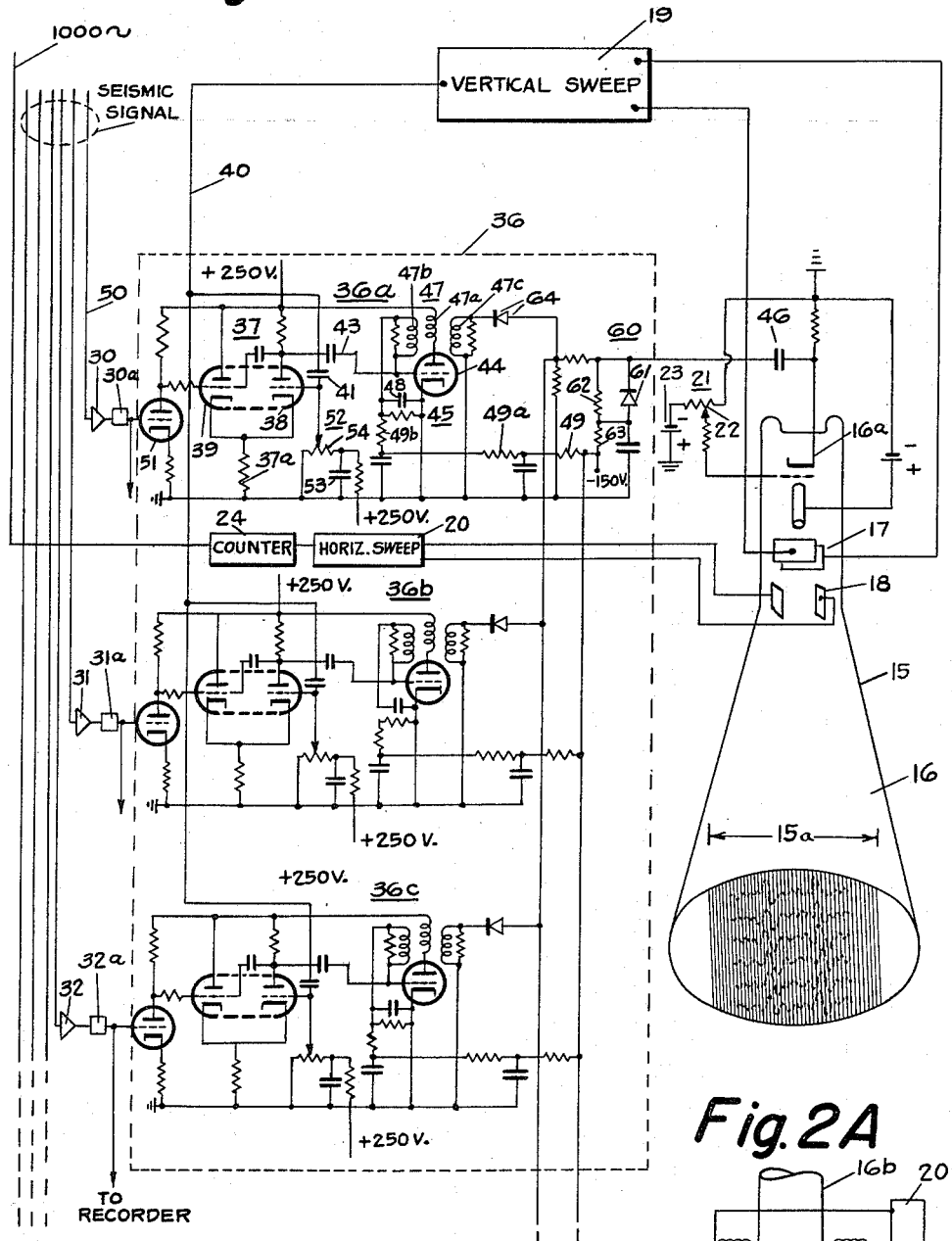
Fig. 2 is a more detailed, schematic diagram of a portion of the system of Fig. 1 and illustrates a preferred embodiment of one aspect of the present invention.

Referring to Figs. 1 and 2, the cathode ray oscilloscope 15 is provided with control or sweeping circuits which cause an electron beam to be deflected or swept vertically across the face of the tube 16 and other control or sweeping circuits which cause the electron beam to be swept or deflected horizontally across the face of the tube, the combined action resulting in what is commonly termed a "raster" on the face of the tube. The raster is here illustrated as a series of visually perceptible vertical lines in section 15a of Fig. 2. However, it will be understood that the intensity of the electron beam preferably will be reduced to the point where the raster, although present, will not be visible. In a preferred arrangement, the electron beam is intensity-modulated as it is deflected vertically across the face of the tube to produce on the tube a dot signifying one point of a trace comprising part of the seismic signal to be visually reproduced. As the electron beam is swept horizontally across the face of the tube, there are visually produced other points which together will be representative of the recorded seismic wave or modifications thereof.

The positions along the deflection path of the electron beam at which the intensity of the beam is increased to produce the dot is controlled by the unit 36 which contains circuits responsive to signals including the instantaneous amplitude of the recorded seismic wave and the instantaneous amplitude of an initiating signal. The initiating signal is comprised of an initiating portion and a linear time-function or time-base portion, the functions of each of which will be described hereinafter. The unit 36 is triggered by the initiating signal derived from the oscilloscope 15 by way of channel 40 to produce pulses to be applied to an intensity-control element of the cathode ray oscilloscope during the vertical excursion of the beam and at time periods when the signal representative of the instantaneous amplitude of the transient signal or seismic wave bears a predetermined relation to the varying magnitude of the time-function portion of the initiating signal.

Referring now to Fig. 2, there is schematically illustrated specific circuitry suitable for the practice of the present invention and including the cathode ray oscilloscope 15 which includes the cathode ray tube 16. The cathode ray tube 16 includes vertical deflection means 17 and horizontal deflection means 18, each associated with their respective sweep or deflection circuits 19 and 20. Although the deflection means are illustrated to be of the electrostatic type, it will be understood that the invention is operable with cathode ray tubes of the type illustrated in Fig. 2A, employing magnetic deflection. There the tube 16b has associated therewith coils 17a and 18a respectively connected to the vertical sweep 19 and the horizontal sweep 20 for production of a high-frequency raster.

The sweep circuits may be of the standard type well known in the art including saw-tooth oscillators. Under control of the sweep circuits 19 and 20, an electron beam, emitted from cathode 16a of the tube 16, is deflected in a vertical direction along one coordinate and horizontally swept along another coordinate across the face of the cathode ray tube 16 to produce a "raster" frame. The intensity of the beam impinging upon the fluorescent surface of the tube 16 is set at a very low value and preferably blanked by adjustment of a bias supply 21 comprised of a potentiometer 22 and a battery 23.

The vertical deflection or sweeping of the electron beam is continuous, preferably at a rate high compared to the frequency components of the transient wave to be visually reproduced; for example, a rate of four kilocycles has been found satisfactory. The horizontal sweeping of the electron beam, as will appear in greater detail hereinafter, is initiated by the initial marker 13 and the subsequent timing signals 12 by way of a pulse counter 24.

Each time the vertical-sweep circuit flies back to initiate a vertical excursion of the electron beam, there is produced the initiating signal, which is simultaneously fed to the various intensity time-control circuits 36a, 36b and 36c comprising the control unit 36 which determine the time at which an increase in the intensity of the electron beam is to take place to visually form on the fluorescent face of the tube 16 a dot or dots representing a point or points of the transient or seismic wave traces. A separate control circuit 36a—36c is provided for each source of seismic signal, only three circuits being shown for the purpose of illustration.

All the control circuits 36a, 36b and 36c are identical and operate in like manner. From the specific description of one, the operation of the others will be understood. The control circuit 36a includes a comparator 37 which is shown to be of the cathode-coupled multivibrator type comprised of two electronic valves 38 and 39, here shown to be of the triode type. The triodes are preferably contained in a single envelope, but may be separate electronic valves or tubes. Under initial conditions, the triode or tube 38 is non-conducting, and the tube 39 is conducting.

The sweep voltage from the generator 19 is applied by way of conductor 40 and condenser 41 as the initiating signal to the control grid of tube 38. Upon the occurrence of the fly-back portion or initiating portion of initiating signal A shown in Fig. 4, i.e., that portion in which the voltage rises from a minimum to a maximum positive value, conduction is initiated in tube 38, and tube 39 is cut off. Cut-off of tube 39 is brought about by increase in current flow through cathode resistor 37a which effectively increases the bias applied to tube 39. As the initiating signal or sweep voltage then decreases and as the potential of the grid of tube 38 comes to within a few volts of the voltage on the cathode of tube 38, regeneration occurs; and tube 38 is cut off and tube 39 begins to conduct. The time interval during which tube 38 conducts depends in part upon the linear slope of the monotonic negative-going portion or time-function portion of the signal A and upon the bias on the grid of tube 39.

Upon the tube 38 being driven to cut-off, there is produced in its plate circuit a positive-going voltage excursion at the trailing edge of pulse D (Fig. 4). The voltage at the anode of tube 38 is applied by way of conductor 43 to the grid of tube 44, forming part of a blocking oscillator 45. The positive pulse causes the blocking oscillator to cycle and to produce a sharp, negative-going pulse of a character similar to that represented by pulse C (Fig. 4). The negative-going pulse is applied by way of capacitor 46 to the cathode 16a of the cathode ray tube 16 and causes an immediate intensification of the electron beam to produce at the face of the tube a visible dot. The position of the dot is determined by the time interval between the sweep flyback voltage or initiating portion of the initiating signal and the time at which the tube 38 is driven to cut-off. The time relationship between the vertical sweep signal and the production of pulses by the comparator 37 and the blocking oscillator 45 is illustrated in Fig. 4, where the sweep-voltage signal A represents the sweep of the electron beam across the face of the cathode ray tube 16, and the dots B identify those positions along the sweep of the electron beam at which the beam is intensity-modulated by the application of the pulses C produced by the blocking oscillator.

Each time the vertical sweep circuit flies back, there is again applied to the comparator 37 an initiating signal including the time-function signal portion which, in the manner above described, causes the production of a visible dot at the face of the cathode ray tube 16. By sweeping the beam horizontally and thus effectively spacing the vertical excursions of the electron beam along a second coordinate of the tube, there will be produced across the face of the cathode ray tube an effectively continuous horizontal line.

The positions of the cathode ray dots comprising the trace at the face of the cathode ray tube are determined by the time it takes to drive the tube 38 to cut-off. By changing this time period, the positions of the cathode ray dots may be changed along each of their respective vertical paths. It will be remembered that the period of time it takes for the tube 38 to be driven to cut-off is determined, at least in part, by the bias applied to the grid of the tube 39. Hence, by changing the bias of tube 39, the positions of the individual dots at the face of the cathode ray tube 16 may be made to vary. Accordingly, by applying a bias signal which varies in accordance with the seismic wave or trace, there will be produced a control pulse when this bias signal bears a predetermined relation to the comparison or time-function signal, a portion of the initiating signal. A series of such control pulses will produce at the face of the tube 16 a trace representative of the seismic wave recorded on the phonographically-reproducible record 10.

The signals to be applied as a bias and representative of the seismic waves are generated by the detectors 14, which convert the recorded signals into electrical impulses which are applied by way of conductor 50 and tube 51 to the grid of tube 39. As these applied signals vary in amplitude, there is caused an instantaneous change in the grid bias of tube 39. Therefore, since the tube 38 will not be driven to cut-off until the cathode potential of tube 39 attains a value within a few volts of its grid potential, it will be seen that the occurrence of an abrupt positive-going change in anode voltage in tube 38 will be a time representation of the instantaneous amplitude of the applied seismic signal.

The control circuit 36a includes a means, circuit 52, for adjusting the average position of the trace produced at the face of the cathode ray tube 16. This control of average trace position is effected by a bias voltage applied to the grid of tube 38 from a source of supply identified as +250 volts by way of a network including capacitor 53 and potentiometer 54. By adjustment of the potentiometer 54, the average grid bias applied to tube 38 may be adjusted to increase the plate current flowing through the tube 38 and thus increase the magnitude of the cathode potential applied to tube 39. Since, as it will be remembered, the time-function signal applied from the vertical sweep circuit is a linear sloping function, it must work for a longer period of time against the average grid bias applied to tube 38 from the potentiometer 54 in order to reduce the plate current of tube 38 to a low enough value such that the cathode potential of tube 39 is reduced to a value within a few volts of the grid potential of tube 39. The greater the grid bias applied to tube 38, the longer it will take for the tube 38 to produce the control signal. This variation in time will be reflected in the position of the trace formed at the face of the cathode ray tube 16. For example, as the bias applied to the tube 38 is increased, the average position of the visible trace is moved upward along the face of the tube 16; and conversely, as the potential applied from the trace-position control circuit is reduced, the average position of the visible trace is lowered. Hence, by adjustment of the potentiometer 54, it is possible to produce an average position trace anywhere across the face of the cathode ray tube 16.

The provision of the circuit means or trace-position control circuit 52 is of value when it is desired, as illustrated, to produce simultaneously at the face of the cathode ray tube 16 a plurality of visible traces representative of the seismic waves recorded on the phonographically-reproducible record 10. By selective adjustment of each of the trace-position control circuits 52, there will be produced at the face of the cathode ray tube 16 a plurality of spaced horizontal lines which will be modulated with respect to the average position in accordance with the signals representative of the seismic waves applied to the comparators 37.

The blocking oscillator 45 is of a type well known in the art and is of particular advantage in that it does not draw current until a trigger signal, such as, for example, a control pulse from the comparator 37, is applied thereto. Hence, during quiescent periods, or periods between the application of pulses, current does not flow through the blocking oscillator, resulting in a reduction in power requirements for the circuit.

The blocking oscillator 45 is maintained in its non-conductive state by a high negative bias applied to its grid by way of the charged capacitor 48. The negative charge on the capacitor 48 is maintained by application of a negative voltage from source −150 volts by way of resistors 49, 49a and 49b. Upon the application to the grid of the tube 44 of a positive pulse from the comparator 37, the tube begins to conduct, and the change in current flow through plate winding 47a of transformer 47 induces a positive feedback signal in secondary winding 47b. The positive feedback signal drives the grid of the tube 44 in a more positive direction, causing the plate current of the tube 44 to increase until it reaches saturation. At that point the positive feedback signal is halted, and the negative potential on the capacitor 46 causes the grid of tube 44 to become less positive, thereby reducing the plate current flowing through the tube. The magnetic field about the plate coil 47a starts to collapse, and in turn induces a voltage in the grid winding or secondary winding 47b, which causes the grid to become more and more negative. This process continues until the tube is driven to cut-off.

At the time the blocking oscillator begins to conduct, a pulse is produced in the plate coil 47b; and by phasing of the winding 47c, there is induced therein by transformer action a negative-going pulse which is applied by way of the capacitor 46 to the cathode of the cathode ray tube 16. By making the cathode 16a more negative the grid is effectively made more positive, hence causing an increase in the intensity of the electron beam to make it visible at the face of the tube.

The time duration of the pulse produced by the blocking oscillator and hence the length of the dot produced at the face of the tube 16 is primarily controlled by the electrical constants of the transformer 47. It has been found that pulse lengths of the order of 1 microsecond will be preferred.

In order that the negative-going pulses applied to the cathode 16a of the cathode ray tube 16 be of equal intensity, there is included between the outputs of the blocking oscillators 45 and the cathode 16a of the cathode ray tube a clipping or limiter network 60 including a diode 61 which may be of the IN39 type. The diode 61 is biased by way of the voltage divider network including resistors 62 and 63 so that the difference between the plate and cathode is set at a value equal to the magnitude of voltage change to be affected at the cathode 16a by the control pulses. For example, the voltage change may be 50 volts, in which case the plate of the diode 61 would be nominally held at —125 volts and the cathode of the diode held at —75 volts during quiescent periods. As a negative pulse is produced at the output of the blocking oscillator 45, the cathode of the diode 61 becomes more and more negative until it bears a predetermined relation to the plate of the diode, at which time conduction will occur through the diode. Upon conduction of diode 61, there is applied to the cathode 16a the potential at the plate of the diode 61, i.e. —125 volts. Thereafter, despite further increase in the pulse output of the blocking oscillator 45, the magnitude of signal applied to cathode 16a will be limited to —125 volts. In this manner control pulses of uniform magnitude will be applied to the intensity control element of the cathode ray tube 16, and the dots produced at the screen of the tube will be of equal intensity.

In order to prevent an interaction between the various control circuits 36, there is provided in each of the outputs of the blocking oscillators 45 a diode 64 which blocks negative pulses produced by the blocking oscillators from being applied to the grid circuits of other blocking oscillators and thus prevents spurious cycling of the blocking oscillators.

Where the output pulses of the blocking oscillators 45 are of high amplitude, there is some possibility of interaction between the various signal channels. The possibility of such interaction is directly related to the extent to which the diodes, such as diodes 64, pass current upon application of a negative pulse thereto. If the diodes 64 are not perfect, current will flow through winding 47c and induce a voltage proportional thereto in winding 47b. The latter voltage is applied to the grid of the blocking oscillator tube 44. High-amplitude pulses at the output of one channel may thus trigger the oscillators of each of the other channels to produce substantially simultaneously a pulse from all of the channels. This, of course, is the most unfavorable condition to be encountered. However, even if the leakage through the diodes is not sufficient to actually trigger associated blocking oscillators, the grid voltage may be so varied from its quiescent value by the presence of the leakage voltage as to produce an undesirable effect. Such an effect has been noted particularly where two seismic signals are of such phase and amplitude as to cause adjacent traces on oscilloscope 16 to cross. This may best be explained by considering two saw-tooth signals on adjacent oscilloscope traces of such amplitude and polarity that the traces cross. Leakage through diodes such as diodes 64 is indicated by non-linearity in one of the two traces immediately adjacent the point of crossing.

In Fig. 3 there is disclosed a modification of the present invention in which the pulses from the blocking oscillators are of low amplitude, and there is connected between the output of the blocking oscillators and the intensity control element of the cathode ray tube a signal-amplifying means. Although only one of the modified control circuits 136 is illustrated, it will be understood that it can be duplicated and connected in the manner to provide the arrangement illustrated in Fig. 2. The control circuit 136 of Fig. 3 is similar in all respects to the control circuit 36 of Fig. 2, except that the secondary plate coil 147C is now phased to produce a positive pulse upon the initiation of cycling of the blocking oscillator 145. The magnitude of the positive pulse is reduced by way of resistors 170 and 171, and is applied by way of a blocking diode or rectifier 164 to the grid 165 of tube 166. The tube 166 and its associated components comprise a high-gain amplifier 167.

The plate voltage of the amplifier tube 166 may be, for example, held at approximately 200 volts D.C. during periods of non-conduction of the tube. The plate voltage is applied by way of capacitor 146 to hold the cathode 16a of the cathode ray tube 16 at a potential positive with respect to the control grid of the tube 16. Upon the application of a positive pulse from the blocking oscillator, the tube 166 conducts, and its plate voltage drops. The drop in the plate voltage is reflected back to the cathode 16a of the cathode ray tube 16, and makes it less positive with respect to the grid, whereupon the cathode ray beam sweeping the face of the tube is made visible to produce a dot at the face of the cathode ray tube.

In order that there be applied to the cathode of the cathode ray tube 16 intensity-modulating signals of substantially constant amplitude, there is included in the output of the amplifier 167 a clipping network including a diode 161 which may be of the 1N39 type. The plate of the diode 161 is biased by a positive potential of approximately +150 volts by way of a voltage divider including the resistors 162 and 163. It will be recalled that during quiescent periods the plate of the tube 166 is at 200 volts D.C. Accordingly, the plate of the diode 161 is negative with respect to its cathode, there being a difference of 50 volts therebetween. When a pulse is applied to the tube 166 from the blocking oscillator 145, the plate of the tube 166 is made less positive. When the potential of the plate drops below 150 volts, the diode 161 conducts to apply its plate voltage of 150 volts to the cathode 16a of the cathode ray tube 16 and thus limits the signal to a pulse of 50 volts. In this manner intensity-modulating pulses, uniformly 50 volts in amplitude, are applied to the cathode 16a of the cathode ray tube 16.

While in the foregoing circuits a blocking oscillator has been utilized as a pulse generator, it will be understood that there may be used other forms of pulse generators of a type in which current is not drawn during the periods intermediate the production of pulses by the voltage comparator. An example of such a pulse generator is illustrated in Fig. 5 as a relaxation oscillator 180 including a grid-controlled gaseous discharge tube 181. The tube 181 which may be of the 885 type is held in a non-conductive state by the application of a negative bias to a grid thereof by way of resistor 182. The grid of the tube 181 is connected to the output of the comparator and receives positive-going control pulses by way of the capacitor 183. Upon the application of a positive-going control pulse, the grid of the tube 181 is made sufficiently positive with regard to the cathode to fire the tube and cause conduction thereof. With conduction of tube 181, the capacitor 184 discharges through the tube, and the flow of current through cathode resistor 185 produces a beam-intensity control pulse. When the positive-going control pulse from the comparator ceases, the grid of tube 181 again becomes very negative and cuts off conduction of the tube. The capacitor 184 then recharges to the full value of the applied D.C. plate voltage B+.

The intensity-control pulses are applied to a control element of the cathode ray tube by way of the conductor 186 for intensity-modulating the electron beam in the production of dots representative of the instantaneous amplitudes of the seismic or transient wave.

Now that the invention has been described as applied to a utilization system including the oscilloscope 15, it will be recalled that the voltage comparator produced spaced output pulses and that the information regarding the characteristic of the instantaneous amplitudes of the seismic waves was contained in the pulse-width bounded by the leading and trailing edges of pulses D (Fig. 4).

Advantage is taken of the generic function of the comparator circuits for producing time-modulation of seismic signals in the field for the production of seismic data recordings having a greatly extended effective dynamic range. Seismic waves produced in the field, as by the use of explosive charges, may have a dynamic range as great as 80 db. Present-day magnetic tape recorders have an effective db range of approximately 48 db. It is quite evident, therefore, a substantial portion of information contained in the seismic waves is missed in the act of recording of the seismic waves with existing facilities. In accordance with the present invention, the dynamic range of the recorder may effectively be increased to 60 db and above by converting the amplitude-modulated waves produced by geophones or other seismic detectors to time-modulated waves for application to the recorder.

In the block diagram, Fig. 6, a source of seismic signals 203, which may be a geophone or other suitable seismic signal detector, has its output fed to a time-modulator circuit 201 by way of channel 204. An initiating signal is produced at an oscillator 200 and fed to a second input of circuit 201 by way of channel 202. The time-modulating circuit or voltage comparator 201 produces a series of pulses containing information as to the nature of the seismic wave, and such pulses are fed by way of channel 207 to a utilization system 205, which in the present case will be a transducer, for the production of phonographically-reproducible records. The output of the oscillator 200 may also be fed by way of channel 206 to the utilization system for the production of timing pulses which will be recorded on the tape record in a manner and for a purpose to be hereinafter described.

A typical recording produced by a system embodying the present invention is illustrated in Fig. 7 as the continuous tape 208, shown to include a time-pulse track 209 and a plurality of seismic signal recording tracks 210, the information as to the character of the seismic waves being recorded in the form of variably spaced pulses 211.

A system for producing a multi-track recording may include a series of seismic signal detectors or geophones 203a—203f, each of which has associated therewith a time-modulating circuit here illustrated to be a voltage comparator 201a—201f. The voltage comparator 201a operates in the same manner as the voltage comparator 37 of Fig. 2 in that it produces a positive-going pulse each time the amplitude of the time-function portion of an initiating signal from the oscillator 200 bears a predetermined relation to the instantaneous amplitude of the seismic signal from the detector 203a. More particularly, the initiating signal is applied to the grid of tube 212 by way of channel 202 and capacitor 203. In each cycle of the signal from oscillator 200 the negative-going or initiating portion thereof operates to reduce the plate current of tube 212 and thus reduce the bias on tube 213 which is coupled to tube 212 by way of cathode resistor 214. The tube 213 has applied to its grid the seismic signal by way of potentiometer 215, amplifier 216 and resistor 217. As stated above, when the instantaneous amplitudes of the seismic signal and the time-function portion of the initiating signal attain a predetermined relation, a pulse is generated in the plate circuit of tube 212. This pulse is generated by driving of the tube 212 to cut-off and initiating conduction in tube 213. The pulse is applied to a cathode-follower stage 218 by way of capacitor 219. Output pulses from the cathode-follower stage 218 are derived across the resistor 220 and fed by way of channel 207a to a recording head 221 of the magnetic tape recorder.

The oscillator 200 may be designed to produce initiating signals at a rate of about 4000 cycles per second, and accordingly, the output pulses 211 will be recorded at the same average rate on the tape 208.

As will appear in greater detail hereinafter, it is desirable to produce a series of timing pulses 209 on the tape 208. Preferably these pulses should have a repetition rate of 1,000 cycles per second. Such pulses may be produced by use of a frequency dividing network or gate 222, whose input is connected by way of conductor 206 to receive 4,000 cycle pulses from the oscillator and which is arranged to produce one output pulse for every four pulses received. Frequency dividing arrangements such as binary scaling circuits are suitable. In addition to the timing pulses 209, there is also recorded on the tape 208 a substantially larger pulse 209a which signifies the instant of detonation of an explosive charge for the generation of the seismic waves.

After the record has been made, it may be removed to a laboratory for further study, or, as shown in Fig. 7, arrangements may be made for play-back of the record in the field so that the results of the test may be evaluated and the determination made of whether or not to make further shot tests. Where the latter arrangement is desirable, the tape recorder may be equipped, as in standard practice, with play-back head 223, whose output may be amplified, clipped and integrated as in demodulator unit 224 to convert the time-modulated voltage pulses representative of the instantaneous amplitudes of the seismic wave to amplitude-varying voltages representative of the seismic wave for application to the visual reproduction system of Fig. 2.

In the study of seismic or transient waves, it is desirable to select a specific portion of the wave for analysis, for example, portion 25 illustrated in Figs. 1 and 7. Hence, it is necessary that the specific portion to be analyzed be repeatedly transmitted for reproduction by the cathode ray tube 16 at a persistence-of-vision rate. A system is illustrated in block schematic form (Fig. 1) for preselecting any given portion of a seismic wave to be reproduced and for repeating the presentation of the selected seismic signals at a persistence-of-vision rate. Such a system is specifically disclosed in the aforementioned copending application of George B. Loper and Robert Pittman and also in the May, 1955 edition of "Electronics" at pages 160–165. A brief description of this system will now be given for a better understanding of the present invention.

It will be remembered that upon the outset of producing the reproducible record 10, there was generated in coincidence with the detonation of the explosive charge and recorded an electrical pulse which appears as the sharp opaque marker 13 superimposed upon the constant frequency and time-base signal 12. The output of the transducer in detector 14 responsive to the top record trace comprises two components. The first component is a constant frequency periodic signal, which regardless of the speed at which the record 10 is driven, provides a scaled time-base voltage for measurement of the time-occurrence on the record 10 of any selected seismic event. The second component is a sharp pulse or initial marker of distinctive character. It is generated once for each complete cycle of the record 10, at a scaled record time corresponding with the instant of detonation of the explosive charge. The scaled time-base signal is produced by variations in light passing through the constant frequency portion 12 of record 10, whereas the initial marker is generated by variations in light due to the opaque marker 13 adjacent the detector 14.

Combined voltages including the distinctive initial marker and the time-base voltage are applied to channel 80 leading from detector 14 and are applied to a selector or separator 81 which has a single input channel, channel 80, and two output channels, channels 82 and 83. The first output channel 82 selectively transmits the initial marker corresponding with the recorded pulse 13 to the circuit 84, a switching unit. Similarly, the channel 83 selectively transmits the periodic time-base voltage corresponding to the periodic wave 12 to the gating unit 85.

As above mentioned, the periodic time-base signal 12 may be of any selected carefully controlled frequency. To expedite calculations in the decimal system, a frequency that is a multiple of 10 is preferred. For the purpose of the present discussion, it will be assumed that the periodic wave 12 has a frequency of 1,000 cycles per second so that the channel 83 transmits a scaled 1,000 cycle per second signal to the gating unit 85.

The switching unit 84 may be a bi-stable multivibrator, for example, which operates selectively to render the gating unit 85 conductive or non-conductive in response to the initial marker pulse 13, thereby to control the intervals during which the periodic time-base signal may be transmitted to the gating unit output channel 86.

When the gating unit 85 is conductive, it serves not only to transmit periodic timing pulses to the channel 86 but also to shape them for application to and actuation of the counting circuit 24. The periodic time-base signal is applied to the counter 24 by channel 86 and is in the form of 1,000 unidirectional "pips" or pulses per scaled second interval, whereas the voltage on the output channel 87 is a single pulse for actuation of the horizontal sweep circuit 20 (Fig. 2) of the oscilloscope 15.

Counter 24 is essentially a selective time-delay network which selects from the periodic time-base signal any selected pulse following the instant that the gating unit 85 is rendered conductive. It operates as a count-down circuit operative to produce pulse division by a selectable whole number ratio. The application of a single selected pulse to the horizontal sweep circuit 20 in each cycle of reproduction of the seismic record 10 triggers it to initiate, for each cycle of the record 10, the presentation of a visual display on the screen of the oscilloscope 15. The seismic events will thereby appear at precisely the same location on the oscilloscope screen for each cycle of record 10. Thus, the record 10 may be repeatedly driven past the detector 14 and the selected portion of the record, such as the portion 25, may be repeatedly displayed on the oscilloscope screen as portion 25a in such detail that filtering means 30a—35a associated with amplifiers 30—35 may be adjusted for optimum resolution of the seismic data. When such resolution has been accomplished, the permanent record 10a may be made of the seismic signal, thus modified, upon energization of the recorder 88 which may be of the conventional type and which records the plurality of traces as undulating lines. More particularly, the modified seismic signals as they appear at the outputs of the amplifying channels are applied by way of the plurality of circuits 89 to the input terminals of the recorder 88. A suitable recorder is described and shown in the aforementioned "Electronics" article.

A time-scale channel 90 interconnects the counter 24 and the recorder 88 to provide a time-controlled scale on the secondary record 10a. A first timing line 91 on record 10a appears in a space relation relative to the record segment 25b, in the same relation as the initial marker 13 bears to the interval 25 of record 10. The space relation between line 13 and segment 25 may be the same as between timing line 91 and record segment 25b or they may be different, depending upon the scaling factor utilized in the reproduction and re-recording of the signals on record 10.

As above noted, the record 10 in the form of a continuous loop, carried by rollers 92 and 93, is driven at a constant speed by means such as a suitable motor (not shown). The record follows a path closely adjacent the detector unit 14 repeatedly to reproduce the seismic signals in the form of varying voltages. Following each cycle of signal generation from detector 14, the gate 85 and counter 24 are reset preparatory to receiving the next succeeding cycle.

A voltage directly related in time to the signal presentation on the oscilloscope 15, such as the voltage applied to the horizontal oscilloscope plates, for example, is applied by way of channel 94 to the bi-stable multivibrator 84 to actuate the latter and render gate 85 non-conductive. Additionally a pulse is applied by way of channel 95 and the reset generating circuit 96 to the counter 24. The reset generating circuit 96 operates to place the counter 24 in a zero or initial condition for reception of a succeeding cycle of timing signals from the detector 14.

While the above selecting circuits are operable to periodically energize the horizontal sweep circuit of the oscillator, the signals from the detector 14 are continuously fed into the intensity-modulating control unit 36, and from that control unit to the intensity control of the cathode ray tube 16. Thus, upon each application of a control pulse to the horizontal sweep circuit, there appears across the face of the cathode ray tube 16, in accordance with the invention, a plurality of traces representative of the recorded seismic waves.

While the invention has been illustrated and described in connection with certain specific modifications thereof, it will be understood that further modifications may now suggest themselves to those skilled in the art, and it is to cover such modifications as are within the scope of the appended claims.

What is claimed is:

1. A system for visually reproducing seismic waves of wide dynamic range comprising, detectors for producing electrical signals representative of the seismic waves, a pulse-generating means for periodically producing initiating signals, comparator circuits, each of which having a first input for simultaneously receiving said initiating signals, each of said comparator circuits having a second input for connection to one of said detectors for receiving said signals representative of one of the seismic waves, said comparator circuits being responsive to a predetermined relation between the amplitude of said initiating signal and the amplitude of said signals to produce time-modulated pulses, a multitrack recorder for recording said time-modulated pulses for the production of a reproducible record of wide dynamic range, detectors for converting said recorded pulses to electrical signals, and means including a cathode ray oscilloscope responsive to said signals for producing a visual presentation of said seismic waves.

2. A system for recording and visual display and analysis of seismic waves of wide dynamic range comprising detectors for producing electrical signals representative of the seismic waves, a pulse-generating means for periodically producing initiating signals, comparator circuits, each of which having a first input for simultaneously receiving said initiating signals, each of said comparator circuits having a second input for connection to one of said detectors for receiving said signals representative of one of the seismic waves, said comparator circuits being responsive to a predetermined relation between the amplitude of said initiating signal and the amplitude of said signals to produce time-modulated pulses, a multitrack recorder for recording said time-modulated pulses for the production of a reproducible record of wide dynamic range, detectors for converting said recorded pulses to electrical signals, means for generating a beam of electrons and directing it at the face of a cathode ray tube, means for controlling the intensity of the beam to turn it on and off, first and second means for deflecting the beam along one dimension and another dimension substantially perpendicular to said one dimension of the face, respectively, means for generating a first sawtooth wave of high frequency and applying it to said first deflecting means, means for generating a second sawtooth wave of low frequency and applying it to said second deflecting means, a plurality of voltage comparators corresponding to the number of electrical signals to be displayed, each comparator including a multivibrator having a pair of inputs, a plurality of pulse generators each connected to the output of a different one of said multivibrators and operable when its multivibrator flips to its unstable condition and generates a keying pulse to generate a very short pulse of voltage, means supplying said first sawtooth to one input of each of said multivibrators, means supplying said signal voltages each to another input of a different one of said multivibrators, each multivibrator including bias means for setting the level of said first sawtooth at which the multivibrator flips to its unstable condition, said bias means each being set differently so that said multivibrators supply keying pulses sequentially during each sweep as the first sawtooth increases in voltage and the beam moves along said one dimension of the face, the relative time of each keying pulse from each multivibrator being determined by the instantaneous value of the signal voltage applied to that multivibrator, and means supplying the outputs of all said pulse generators to said intensity-controlling means to turn the beam on each time a pulse generator develops a pulse of voltage.

3. A system for recording and visual display and analysis of seismic waves of wide dynamic range comprising detectors for producing electrical signals representative of the seismic waves, a pulse-generating means for periodically producing initiating signals, comparator circuits, each of which having a first input for simultaneously receiving said initiating signals, each of said comparator circuits having a second input for connection to one of said detectors for receiving said signals representative of one of the seismic waves, said comparator circuits being responsive to a predetermined relation between the amplitude of said initiating signal and the amplitude of said signals to produce time-modulated pulses, a multitrack recorder for recording said time-modulated pulses for the production of a reproducible record of wide dynamic range, detectors for converting said recorded pulses to electrical signals, means for generating a beam of electrons and directing it at the face of a cathode ray tube, means for controlling the intensity of the beam to turn it on and off, first and second means for deflecting the beam along one dimension and another dimension substantially perpendicular to said one dimension of the face, respectively, means for generating a first sawtooth wave of high frequency and applying it to said first deflecting means, means for generating a second sawtooth wave of low frequency and applying it to said second deflecting means, a plurality of voltage comparators corresponding to the number of signal voltages to be exhibited, each comparator including a multivibrator having a pair of inputs, a plurality of blocking oscillators each connected to the output of a different one of said multivibrators and operable when its multivibrator flips to its unstable condition and generates a keying pulse to generate a very short pulse of voltage, means supplying said first sawtooth to one input of each of said multivibrators, means supplying said signal voltages each to the other input of a different one of said multivibrators, each multivibrator including bias means for setting the level of said first sawtooth at which the multivibrator flips to its unstable condition, said bias means each being set differently so that said multivibrators supply keying pulses sequentially during each sweep as the first sawtooth increases in voltage and the beam moves along said one dimension of the face, the relative time of each keying pulse from each multivibrator being determined by the instantaneous value of the signal voltage applied to that multivibrator, and means supplying the outputs of all the blocking oscillators to said intensity-controlling means to turn the beam on each time a blocking oscillator develops a pulse of voltage.

4. A system for recording and visual display and analysis of seismic waves of wide dynamic range comprising detectors for producing electrical signals representative of the seismic waves, a pulse-generating means for periodically producing initiating signals, comparator circuits, each of which having a first input for simultaneously receiving said initiating signals, each of said comparator circuits having a second input for connection to one of said detectors for receiving said signals representative of one of the seismic waves, said comparator circuits being responsive to a predetermined relation between the amplitude of said initiating signal and the amplitude of said signals to produce time-modulated pulses, a multitrack recorder for recording said time-modulated pulses for the production of a reproducible record of wide dynamic range, detectors for converting said recorded pulses to electrical signals, means for generating a beam of electrons and directing it at the face of a cathode ray tube, means for controlling the intensity of the beam to turn it on and off, first and second means for deflecting the beam along one dimension and another dimension substantially perpendicular to said one dimension of the face, respectively, means for generating a first sawtooth wave of high frequency and applying it to said first deflecting means, means for generating a second sawtooth wave of low frequency and applying it to said second deflecting means, a plurality of voltage comparators corresponding to the number of signal voltages to be exhibited, each comparator including a monostable multivibrator having a pair of inputs, a plurality of relaxation oscillators each including a grid-controlled gaseous discharge tube and each connected to the output of a different one of said multivibrators and operable when its multivibrator flips to its unstable condition and generates a keying pulse to be applied to an associated one of said grids to generate a very short pulse of voltage, means supplying said first sawtooth to one input of each of said multivibrators, means supplying said signal voltages each to the other input of a different one of said multivibrators, each multivibrator including bias means for setting the level of said first sawtooth at which the multivibrator flips to its unstable condition, said bias means each being set differently so that said multivibrators supply keying pulses sequentially during each sweep as the first sawtooth increases in voltage and the beam moves along said one dimension of the face, the relative time of each keying pulse from each multivibrator being determined by the instantaneous value of the signal voltage applied to that multivibrator, and means supplying the outputs of all the relaxation oscillators to said intensity-controlling means to turn the beam on each time a relaxation oscillator develops a pulse of voltage.

5. A system for visually displaying on the face of a cathode ray tube a plurality of signal voltages reproducibly recorded comprising means for generating a beam of electrons and directing it at the face, means for controlling the intensity of the beam to turn it on and off, first and second means for deflecting the beam along one dimension and another dimension substantially perpendicular to said one dimension of the face, respectively, means for generating a first sawtooth wave of high frequency and applying it to said first deflecting means, means for generating a second sawtooth wave of low frequency and applying it to said second deflecting means, a plurality of voltage comparators corresponding to the number of signal voltages to be exhibited, each comparator including a monostable multivibrator having a pair of inputs, a plurality of blocking oscillators each connected to the output of a different one of said multivibrators and operable when its multivibrator flips to its unstable condition and generates a keying pulse to generate a very short pulse of voltage, means supplying said first sawtooth to one input of each of said multivibrators, means supplying said signal voltages each to the other input of a different one of said multivibrators, each multivibrator including bias means for setting the level of said first sawtooth at which the multivibrator flips to its unstable condition, said bias means each being set differently so that said multivibrators supply keying pulses sequentially during each sweep as the first sawtooth increases in voltage and the beam moves along said one dimension of the face, the relative time of each keying pulse from each multivibrator being determined by the instantaneous value of the signal voltage applied to that multivibrator, and means supplying the outputs of all the blocking oscillators to said intensity-controlling means to turn the beam on each time a blocking oscillator develops a pulse of voltage.

6. A system for visually displaying on the face of a cathode ray tube a plurality of signal voltages reproducibly recorded comprising means for generating a beam of electrons and directing it at the face, means for controlling the intensity of the beam to turn it on and off, first and second means for deflecting the beam along one dimension and another dimension substantially perpendicular to said one dimension of the face, respectively, means for generating a first sawtooth wave of high frequency and applying it to said first deflecting means, means for generating a second sawtooth wave of low frequency and applying it to said second deflecting means, a plurality of voltage comparators corresponding to the number of signal voltages to be exhibited, each comparator including a monostable multivibrator having a pair of inputs, a plurality of relaxation oscillators each including a grid-controlled gaseous discharge tube and each connected to the output of a different one of said multivibrators and operable when its multivibrator flips to its unstable condition and generates a keying pulse to be applied to an associated one of said grids to generate a very short pulse of voltage, means supplying said first sawtooth to one input of each of said multivibrators, means supplying said signal voltages each to the other input of a different one of said multivibrators, each multivibrator including bias means for setting the level of said first sawtooth at which the multivibrator flips to its unstable condition, said bias means each being set differently so that said multivibrators supply keying pulses sequentially during each sweep as the first sawtooth increases in voltage and the beam moves along said one dimension of the face, the relative time of each keying pulse from each multivibrator being determined by the instantaneous value of the signal voltage applied to that multivibrator, and means supplying the outputs of all the relaxation oscillators to said intensity-controlling means to turn the beam on each time a relaxation oscillator develops a pulse of voltage.

7. A system for visually displaying on the face of a cathode ray tube a plurality of signal voltages reproducibly recorded comprising means for generating a beam of electrons and directing it at the face, means for controlling the intensity of the beam to turn it on and off, first and second means for deflecting the beam along one dimension and another dimension substantially perpendicular to said one dimension of the face, respectively, means for generating a first sawtooth wave of high frequency and applying it to said first deflecting means, means for generating a second sawtooth wave of low frequency and applying it to said second deflecting means, a plurality of voltage comparators corresponding to the number of signal voltages to be exhibited, each comparator including a monostable multivibrator having a pair of inputs, a plurality of blocking oscillators each connected to the output of a different one of said multivibrators and operable when its multivibrator flips to its unstable condition and generates a keying pulse to generate a very short pulse of voltage, means supplying said first sawtooth to one input of each of said multivibrators, means supplying said signal voltages each to the other input of a different one of said multivibrators, each multivibrator including bias means for setting the level of said first sawtooth at which the multivibrator flips to its unstable condition, said bias means each being set differently so that said multivibrators supply keying pulses sequentially during each sweep as the first sawtooth increases in voltage and the beam moves along said one dimension of the face, the relative time of each keying pulse from each multivibrator being determined by the instantaneous value of the signal voltage applied to that multivibrator, and means responsive to the outputs of all the blocking oscillators for applying to said intensity-controlling means pulses of uniform level to turn the beam on each time a blocking oscillator develops a pulse of voltage, said last-named means including an amplifier having an input to which the outputs of said blocking oscillators are applied and a limiter connected to an output of said amplifier for limiting the pulses to be applied to said intensity-controlling means to a predetermined uniform level.

8. A system for wide dynamic recording of seismic signals comprising a time base oscillator for generating initiating signals, means for generating analogue electrical signals representative of the instantaneous amplitudes of said seismic signals, a plurality of voltage comparators corresponding to the number of seismic signals to be recorded, each comparator including a multivibrator having a pair of inputs, means supplying said initiating signals to one input of each of said multivibrators, means supplying said electrical signals each to another input of a different one of said multivibrators, each of said multivibrators being responsive to a predetermined relation between the instantaneous amplitude of said initiating signals and the amplitude of its applied electrical signal for producing a pulse output signal containing information as to the instantaneous magnitude of the seismic signal existing between successive initating signals, and a multi-track recorder to which said output signals from each multivibrator are applied in production of a phonographically reproducible recording of said output signals.

References Cited in the file of this patent

UNITED STATES PATENTS

| | | |
|---|---|---|
| 2,483,140 | Higham | Sept. 27, 1949 |
| 2,628,689 | Rieber | Feb. 17, 1953 |
| 2,658,579 | Rieber | Nov. 10, 1953 |
| 2,703,150 | Rieber | Mar. 1, 1955 |

FOREIGN PATENTS

| | | |
|---|---|---|
| 156,861 | Australia | Jan. 17, 1952 |

OTHER REFERENCES

Jakosky et al.: "Geophysics," October 1952 (pp. 721–738).